(12) United States Patent
Kerechanin, II

(10) Patent No.: US 8,790,059 B2
(45) Date of Patent: Jul. 29, 2014

(54) WASHER ASSEMBLY FOR MOUNTING ON IRREGULAR SURFACES

(75) Inventor: Charles W. Kerechanin, II, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/430,878

(22) Filed: Mar. 27, 2012

(65) Prior Publication Data

US 2013/0259600 A1  Oct. 3, 2013

(51) Int. Cl.
*F16B 43/02* (2006.01)

(52) U.S. Cl.
CPC ..................... *F16B 43/02* (2013.01)
USPC ......................................... 411/537

(58) Field of Classification Search
CPC ................................ F16B 43/00; F16B 43/02
USPC .................... 411/368, 531, 537, 538
See application file for complete search history.

(56) References Cited

U.S. PATENT DOCUMENTS

| | | | | |
|---|---|---|---|---|
| 839,972 A | * | 1/1907 | Walker | 238/100 |
| 1,345,358 A | * | 7/1920 | Fuller | 403/390 |
| 1,937,818 A | * | 12/1933 | French | 411/535 |
| 1,938,153 A | * | 12/1933 | Reeves | 249/217 |
| 1,963,799 A | * | 6/1934 | Nelson | 52/37 |
| 2,770,161 A | * | 11/1956 | Schutte | 411/533 |
| 3,220,289 A | * | 11/1965 | Farekas | 82/147 |
| 3,382,630 A | * | 5/1968 | Chivers | 52/208 |
| 3,438,300 A | * | 4/1969 | Blom et al. | 411/371.2 |
| 3,749,362 A | * | 7/1973 | O'Connor et al. | 254/29 A |
| 4,398,691 A | * | 8/1983 | Wilke | 248/235 |
| 4,958,603 A | * | 9/1990 | Heimer | 123/195 A |
| D342,936 S | | 1/1994 | Schreiber et al. | |
| 5,451,116 A | * | 9/1995 | Czachor et al. | 403/338 |
| 5,697,650 A | * | 12/1997 | Brown | 285/197 |
| D408,790 S | | 4/1999 | Kiely et al. | |
| 6,217,270 B1 | * | 4/2001 | Stager | 411/537 |
| 6,282,857 B1 | * | 9/2001 | Rubenacker | 52/410 |
| 6,450,415 B1 | * | 9/2002 | Kirchner et al. | 238/315 |
| 7,021,855 B2 | * | 4/2006 | Hardtke et al. | 403/168 |
| 7,056,053 B2 | * | 6/2006 | Schilling et al. | 403/337 |
| D524,638 S | | 7/2006 | Berhow | |
| 7,371,027 B2 | * | 5/2008 | Mochizuki | 403/289 |
| 7,399,150 B2 | * | 7/2008 | Hofschneider | 411/399 |
| 7,850,410 B1 | * | 12/2010 | Curtis | 411/537 |
| 8,267,003 B1 | * | 9/2012 | Lou et al. | 89/36.08 |
| 2004/0101384 A1 | * | 5/2004 | Schilling et al. | 411/537 |
| 2008/0127961 A1 | * | 6/2008 | McPherson | 124/88 |

* cited by examiner

*Primary Examiner* — Flemming Saether
(74) *Attorney, Agent, or Firm* — Noah J. Hayward

(57) ABSTRACT

A washer assembly includes a threaded fastener head engaging portion and a surface engaging portion. The threaded fastener head engaging portion includes a head engaging face configured to lie in a plane substantially perpendicular to a longitudinal length of a threaded fastener passed through an opening at an axial center of the threaded fastener head engaging portion. The surface engaging portion includes a slot and a surface engaging face. The slot extends through the surface engaging portion along a line extending through an axial center of the surface engaging portion. An adjustable interface is defined between the surface engaging portion and the threaded fastener head engaging portion to enable the slot to receive the threaded fastener such that the surface engaging face lies parallel to a surface that is not perpendicular to the longitudinal length of the threaded fastener.

18 Claims, 4 Drawing Sheets

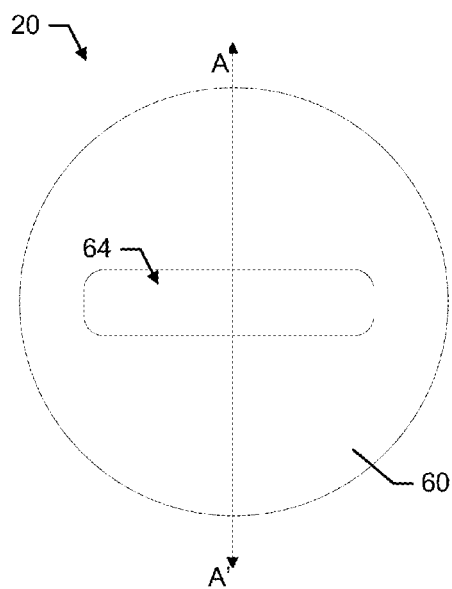
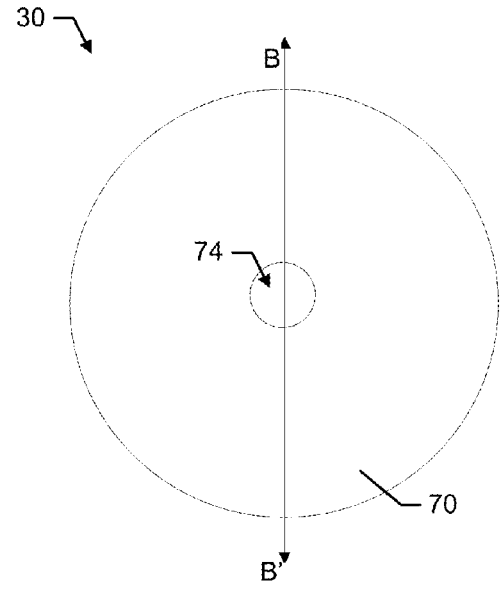
FIG. 2A.  FIG. 3A.
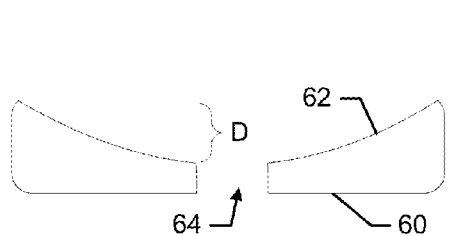
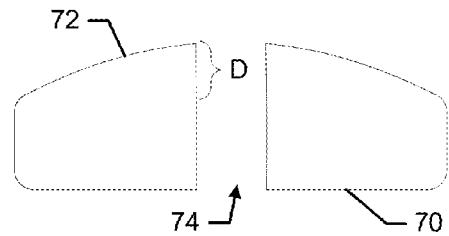
FIG. 2B.  FIG. 3B.

WASHER ASSEMBLY FOR MOUNTING ON IRREGULAR SURFACES

STATEMENT OF GOVERNMENTAL INTEREST

This invention was made with government support under contract number N00024-03-D-6606 awarded by the Department of the Navy. The government has certain rights in the invention

BACKGROUND OF THE INVENTION

1. Field of the Invention

Example embodiments generally relate to fastening devices and, more particularly, relate to a washer assembly for mounting on irregular surfaces.

2. Description of the Related Art

Washers are devices that are in relatively common use in combination with fastening devices such as screws, nuts, bolts and/or the like. A washer is typically a thin plate (often round) with a hole (typically in its center) through which a threaded fastener (e.g., a screw, nut or bolt) is passed. The washer is often used to distribute the load of the threaded fastener or act as a spacer, wear pad, locking device, vibration reducer, corrosion preventer/inhibitor, and/or the like. The outer diameter of the washer (i.e., the edge of the circular shaped plate) is larger than (and in some cases at least about twice long as) the inner diameter of the washer (i.e., the diameter of the hole in the center).

Washers are most commonly flat round discs that have round holes in their centers. The round hole in the center of a washer is often slightly larger than the diameter of the threaded fastener with which the washer is to be used or is at least smaller than a diameter of the head of the threaded fastener (or a nut used in connection with the threaded fastener). If the diameter of the hole in the center of the washer is too large, the entire head of a screw, nut or bolt with which the washer is being used may pass entirely through the hole when a load is applied. A washer is commonly in contact with a surface that lies in a plane substantially perpendicular to the longitudinal length of the threaded fastener with which the washer is being used.

There are some specialized washers that do not have the common profile of a flat round disc. These washers may be used in specific situations to perform corresponding specific functions, or may be used with somewhat irregular surfaces. For example, split washers may be similar to a flat washer except that there is a split extending radially from the hole in the center of the washer to the outer diameter of the washer. The portions of the washer on either side of the split may be at different elevations. Such a washer may be useful for applying a spring force. Wave washers may have an undulating (or wavy) profile and conical washers may be slightly cone shaped to also provide a spring force when they are employed. However, each of these washers is typically employed in situations where the washer is applied to a surface that lies substantially perpendicular to the longitudinal length of the threaded fastener with which they are used. Thus, these washers may not function properly if they are attempted to be used in connection with a surface that does not lie perpendicular to the longitudinal length of the threaded fastener with which they are used. Accordingly, damage may be inflicted on such a surface or the fastener may not function properly.

SUMMARY OF THE INVENTION

Accordingly, in order to enable the provision of a washer assembly that can be used on irregular surfaces, including surfaces that are angled such that they do not lie in a plane that is substantially perpendicular to the longitudinal length of the threaded fastener with which they are employed, some example embodiments may provide a slotted spherical washer assembly. The slotted spherical washer assembly may include a surface engaging portion and a threaded fastener head engaging portion that are enabled to fit with one another over a relatively large range of surface angles by employing a slot in the surface engaging portion.

In one example embodiment, a washer assembly is provided. The washer assembly may include a threaded fastener head engaging portion and a surface engaging portion. The threaded fastener head engaging portion may include a head engaging face configured to lie in a plane substantially perpendicular to a longitudinal length of a threaded fastener passed through an opening at an axial center of the threaded fastener head engaging portion. The surface engaging portion may include a slot and a surface engaging face. The slot may extend through the surface engaging portion along a line extending through an axial center of the surface engaging portion. An adjustable interface is defined between the surface engaging portion and the threaded fastener head engaging portion to enable the slot to receive the threaded fastener such that the surface engaging face lies parallel to a surface that is not perpendicular to the longitudinal length of the threaded fastener.

In another example embodiment, a fastening device is provided. The fastening device may include a threaded fastener including a head disposed at one end thereof, and a washer assembly including a threaded fastener head engaging portion and a surface engaging portion. The threaded fastener head engaging portion may include a head engaging face configured to lie in a plane substantially perpendicular to a longitudinal length of the threaded fastener responsive to passing the threaded fastener through an opening at an axial center of the threaded fastener head engaging portion. The head engaging face may engage the head or a nut of the threaded fastener. The surface engaging portion may include a slot and a surface engaging face. The slot may extend through the surface engaging portion along a line extending through an axial center of the surface engaging portion. An adjustable interface may be defined between the surface engaging portion and the threaded fastener head engaging portion to enable the slot to receive the threaded fastener such that the surface engaging face lies parallel to a surface that is not perpendicular to the longitudinal length of the threaded fastener.

Some example embodiments may improve the ability of threaded fasteners to be employed over irregular (e.g., angled) surfaces.

BRIEF DESCRIPTION OF THE VIEWS OF THE DRAWINGS

Figure 1:
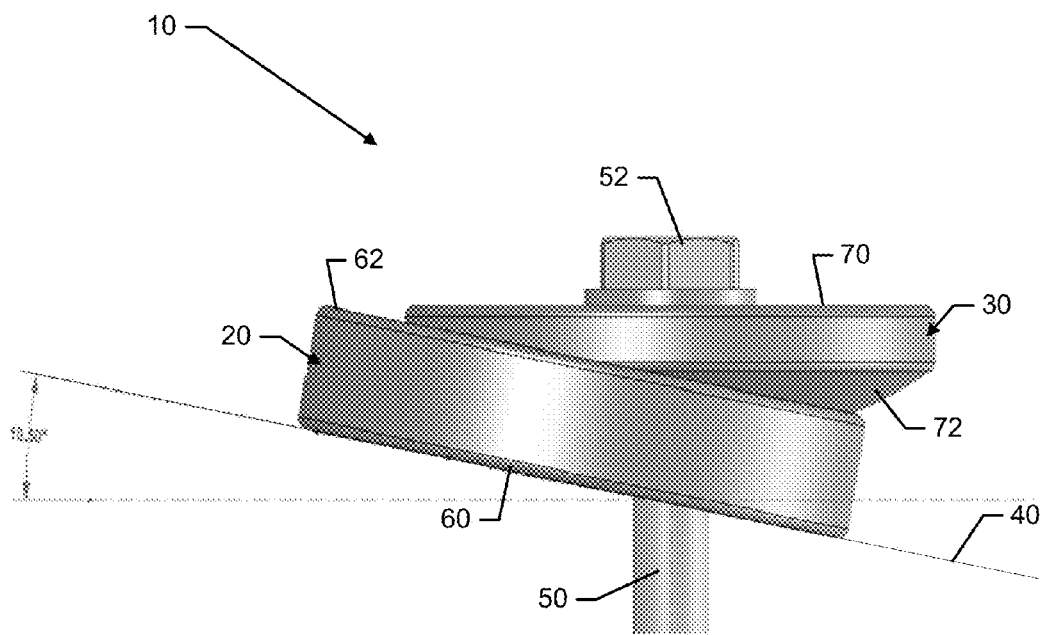
Figure 4:
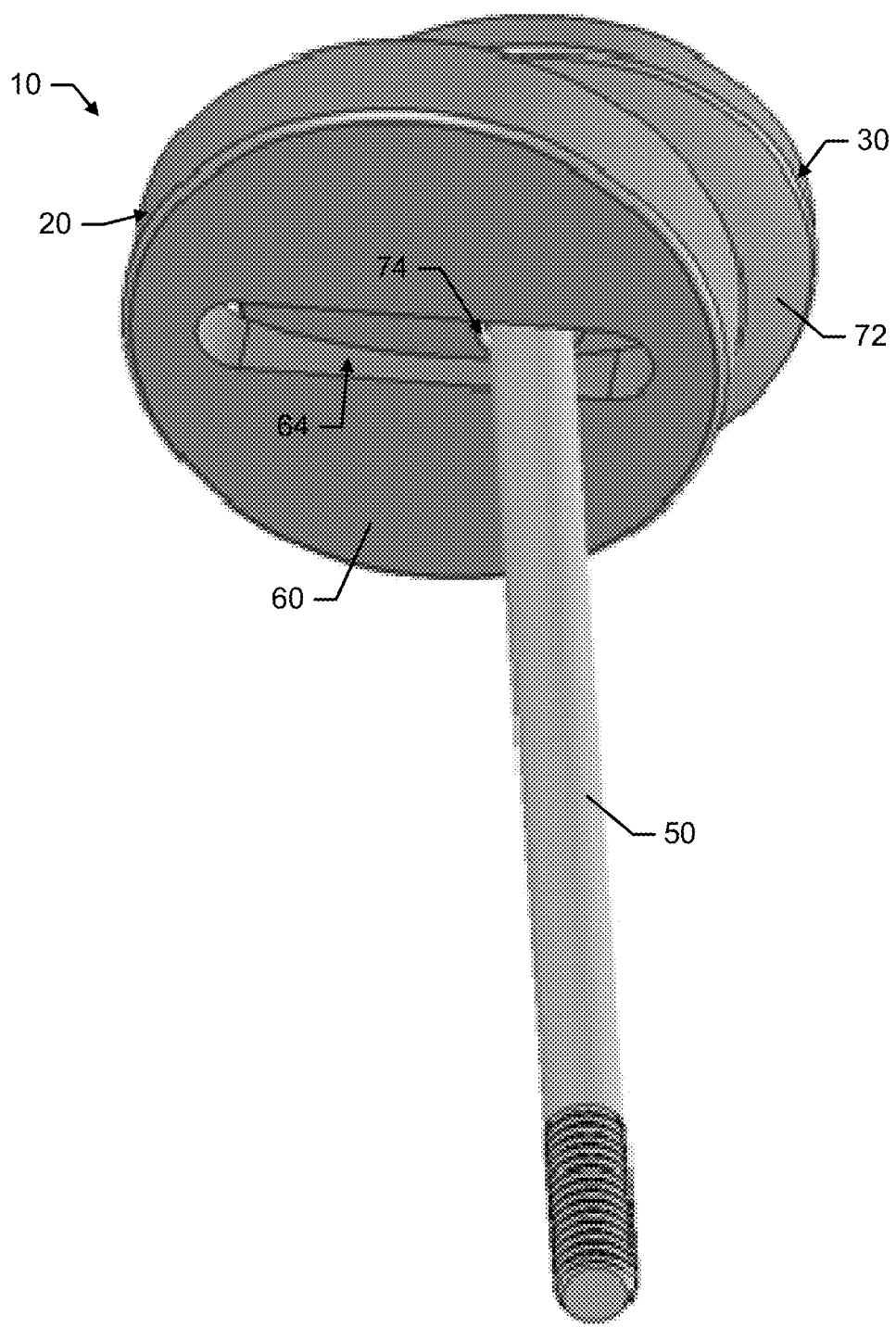
Figure 5:
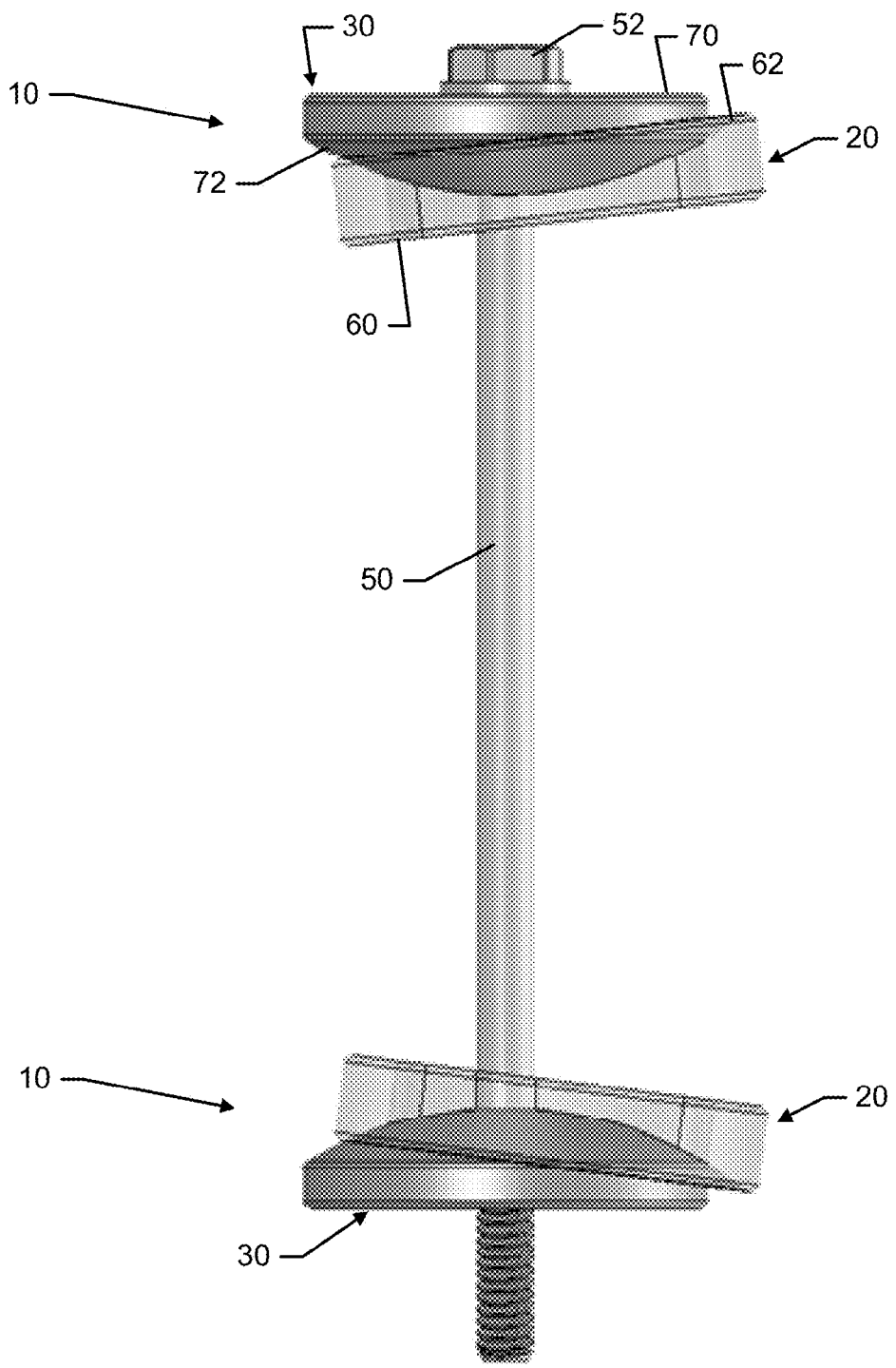

Having thus described the invention in general terms, reference will now be made to the accompanying drawings, which are not necessarily drawn to scale, and wherein:

FIG. 1 illustrates a side view of a slotted spherical washer assembly according to an example embodiment;

FIG. 2A illustrates a bottom view of a surface engaging portion of the slotted spherical washer assembly according to an example embodiment;

FIG. 2B illustrates a cross sectional view of the surface engaging portion taken along the line A-A' of FIG. 2A according to an example embodiment;

FIG. 3A illustrates a top view of a threaded fastener head engaging portion of the slotted spherical washer assembly according to an example embodiment;

FIG. 3B illustrates a cross sectional view of the threaded fastener head engaging portion taken along the line B-B' of FIG. 3A according to an example embodiment;

FIG. 4 illustrates a perspective view of the slotted spherical washer assembly according to an example embodiment; and FIG. 5 illustrates two instances of a slotted spherical washer assembly being employed with respect to a single instance of a threaded fastener so that two surfaces at different angles can be effectively engaged by each corresponding instance of the slotted spherical washer assembly proximate to respective longitudinal ends of the threaded fastener according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may improve the ability of a threaded fastener to be used in a situation where a longitudinal length of the threaded fastener is not perpendicular to the surface with which the threaded fastener is being employed by providing an adjustable interface between two portions of a washer assembly. FIG. 1 illustrates a side view of a slotted spherical washer assembly 10 according to an example embodiment. As shown in FIG. 1, the slotted spherical washer assembly 10 may include a surface engaging portion 20 and a threaded fastener head engaging portion 30. The surface engaging portion 20 may be configured to enable the surface engaging portion 20 to conform to (i.e., lie parallel to a plane of) a surface 40 that is not substantially perpendicular to a longitudinal length of a threaded fastener 50. The threaded fastener 50 of this example is a lag bolt with a hex head. However, a head 52 of the threaded fastener 50 could take any of a number of other forms in alternative embodiments. Moreover, in some embodiments, the threaded fastener 50 could be threaded at both of its ends and thus, rather than having any head, one or more nuts may be employed in connection with the threaded ends. Thus, as used herein, it should be appreciated that the head 52 may be functionally equivalent to a nut. As such, wherever the term "head" is used, it should be appreciated that a "nut" could be substituted in an alternative embodiment. As shown in FIG. 1, the head 52 of the threaded fastener 50 may engage (directly or indirectly (e.g., via one or more other washers)) the threaded fastener head engaging portion 30 while the surface engaging portion 20 engages the surface 40.

FIG. 2, which includes FIGS. 2A and 2B, illustrates the surface engaging portion 20 according to an example embodiment. In this regard, FIG. 2A illustrates a bottom view of the surface engaging portion 20 and FIG. 2B illustrates a cross sectional view of the surface engaging portion 20 taken along the line A-A' of FIG. 2A. FIG. 3, which includes FIGS. 3A and 3B, illustrates the threaded fastener head engaging portion 30 according to an example embodiment. In this regard, FIG. 3A illustrates a top view of the threaded fastener head engaging portion 30 and FIG. 3B illustrates a cross sectional view of the threaded fastener head engaging portion 30 taken along the line B-B' of FIG. 3A. An example embodiment will now be described in reference to FIGS. 1-3.

As shown in FIGS. 1 and 2, the surface engaging portion 20 includes a surface engaging face 60 which is generally configured to engage the surface 40 such that the surface engaging face 60 and the surface 40 generally lie parallel and in contact with each other. The surface engaging portion 20 also includes a concave face 62 that forms an opposite face with respect to the surface engaging face 60. The concave face 62 and the surface engaging face 60 may be connected to each other at their respective radial limits by a sidewall that is substantially perpendicular to the surface engaging face 60. A slot 64 may be defined in the surface engaging portion 20 to extend from the concave face 62 to the surface engaging face 60 along a line extending through a mutual axial center of each of the concave face 62 and the surface engaging face 60. The slot 64 may have a consistent width over the entire length of the slot 64. In some embodiments, the width of the slot 64 may be slightly larger than (e.g., by less than 1 mm) the diameter of the threaded fastener 50 and at least less than the diameter of the head 52. The length may be at least three times the width dimension and may be longer to give greater ranges of angles that can be supported using the slotted spherical washer assembly 10. Although the slot 64 has a substantially rectangular shape in FIG. 2, it should be appreciated that the slot 64 could alternatively have other shapes including an oval shape or even a circular shape as long as the size of the oval or circular shape is small enough to prevent the threaded fastener head engaging portion 30 from passing through the slot 64 and there is sufficient surface area on the concave face 62 to support engagement with the threaded fastener head engaging portion 30.

Meanwhile, as shown in FIGS. 1 and 3, the threaded fastener head engaging portion 30 includes a head engaging face 70. The threaded fastener head engaging portion 30 is generally configured such that the head engaging face 70 engages the head 52 (or a nut) of the threaded fastener and lies in a plane that is substantially perpendicular to a longitudinal length of the threaded fastener 50 when the threaded fastener 50 and the threaded fastener head engaging portion 30 are coupled together. The threaded fastener head engaging portion 30 also includes a convex face 72 that forms an opposite face with respect to the head engaging face 70. The convex face 72 and the head engaging face 70 may be connected to each other at their respective radial limits by a sidewall that is substantially perpendicular to the head engaging face 70. A fastener receiver 74 may be provided as an orifice defined in the threaded fastener head engaging portion 30 to extend from the convex face 72 to the head engaging face 70 along a line extending through a mutual axial center of each of the convex face 72 and the head engaging face 70. The fastener receiver 74 be generally circular and may have a diameter that is slightly larger than (e.g., by less than 1 mm) the diameter of the threaded fastener 50 and at least less than the diameter of the head 52. In an example embodiment, a diameter of the surface engaging portion 20 and the threaded fastener head engaging portion 30 may be substantially equal.

The concave face 62 may extend inwardly toward the surface engaging face 60 by an amount D that is substantially equal to the degree to which the convex face 72 extends outwardly away from the head engaging face 70. In other words, a depth at an axial center of the concave face 62 may be substantially equal to an amount of protrusion at an axial center of the convex face 72. Accordingly, when the convex face 72 is inserted into the concave face 62, the concave face 62 and the convex face 72 may substantially fit together such that the concave face 62 and the convex face 72 contact one another over substantially all of the area over which the faces are proximate to each other. In some embodiments, the amount D may be selected (and therefore also the thickness of the surface engaging portion 20 and the threaded fastener head engaging portion 30 may be selected) to define a range of surface angles over which the slotted spherical washer assembly 10 is useful. The length of the slot 64 may also be lengthened in some cases in order to increase the range of angles over which the slotted spherical washer assembly 10 may be useable. In this regard, for example, a typical spherical washer may only be able to compensate for surface irregularity up to about 4 degrees. However, the slotted spherical washer assembly 10 of FIG. 1 may be enabled to compensate for a surface that is up to about 15 degrees out of perpendicularity with respect to the longitudinal length of the threaded fastener 50 by virtue of the length of the slot 64 (and therefore the ability to offset the surface engaging portion 20 from the threaded fastener head engaging portion 30). By selecting deeper concave and more bulbous convex surfaces in connection with a relatively longer slot, even greater angled surfaces than 15 degrees may be accommodated in some embodiments.

By passing the threaded fastener 50 through the fastener receiver 74 and then passing the threaded fastener 50 through the slot 64 such that the surface engaging face 60 is proximate to the head 52 and the convex face 72 is proximate to the concave face 62, the slotted spherical washer assembly 10 may be made ready for employment in connection with engagement with a surface. By generally aligning the sidewall of the surface engaging portion 20 with the sidewall of the threaded fastener head engaging portion 30, an equivalent of a conventional washer may be achieved. In other words, by placing the sidewalls in registration with each other, the surface engaging portion 20 and the threaded fastener head engaging portion 30 may combine to form a washer that engages a surface that is substantially perpendicular to the longitudinal length of the threaded fastener 50. However, as surface angles are encountered that do not lie substantially perpendicular to the longitudinal length of the threaded fastener 50 are encountered, the surface engaging face 60 of the surface engaging portion 20 may lie substantially parallel to and in contact with such a surface by offsetting the sidewalls of the surface engaging portion 20 and the threaded fastener head engaging portion 30 so that they are no longer aligned. In this regard, for example, the threaded fastener 50 may fit through the slot 64 of the surface engaging portion 20 at a portion of the slot 64 that is separated from the axial center of the surface engaging portion 20 as shown in FIG. 4, which illustrates a perspective view of the slotted spherical washer assembly 10 according to an example embodiment. The degree of offset of the threaded fastener 50 from the axial center of the surface engaging portion 20 within the slot 64 may be adjusted in order to correspondingly adjust an amount of offset between a plane in which the surface engaging surface 60 lies and a plane in which the head engaging surface 70 lies.

As such, the convex surface 72 and the concave surface 62 combine to form a flexible joint or adjustable interface between the surface engaging portion 20 and the threaded fastener head engaging portion 30 to enable the surface engaging portion 20 to be offset relative to the threaded fastener head engaging portion 30. The offset may be facilitated by the slot 64 enabling the threaded fastener 50 to be received at a plurality of angles between the surface engaging face 62 and the longitudinal length of the threaded fastener 50. The offset of the surface engaging portion 20 may enable the surface engaging face 60 to lie substantially parallel to the surface 40 (which may not be perpendicular to the longitudinal length of the threaded fastener 50), while the head engaging face 70 of the threaded fastener head engaging portion 30 lies in a plane that is substantially perpendicular to the longitudinal length of the threaded fastener 50. In some cases, the offset may be greater than 4 degrees, or even greater than 15 degrees.

Accordingly, the slot 64 may be utilized to enable the surface engaging portion 20 to receive the threaded fastener 50 at a location other than the axial center of the surface engaging portion 20. Engagement in this fashion may enable the surface engaging face 60 of the surface engaging portion 20 to lie in a plane that is not necessarily parallel to the plane in which the head engaging face 70 lies while engaging an irregular surface. The provision of the slot 64 in combination with the design of the convex surface 72 and the concave surface 62 to form the flexible joint, enables the functions of a washer to be performed (e.g., load distribution, space provision, corrosion prevention, and/or the like) even when used in connection with surfaces that are not perpendicular to the longitudinal length of the threaded fastener.

In some embodiments, one instance of the slotted spherical washer assembly 10 may be used proximate to the head 52 of the threaded fastener 50 as shown in FIGS. 1 and 4. However, in other embodiments, an instance of the slotted spherical washer assembly 10 may be employed also or alternatively at a distal end of the threaded fastener 50 proximate to a nut that engages the threaded fastener 50 instead of proximate to the head 52. In such an embodiment, the head engaging surface 70 of the threaded fastener head engaging portion 30 may engage the nut in a similar manner to that described above in relation to engagement with the head 52. FIG. 5 illustrates an example in which two instances of the slotted spherical washer assembly 10 are employed with respect to a single instance of the threaded fastener 50 so that two surfaces at different angles can be effectively engaged by each corresponding instance of the slotted spherical washer assembly 10 proximate to respective longitudinal ends of the threaded fastener.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A washer assembly comprising:
a threaded fastener head engaging portion including a head engaging face configured to lie in a plane substantially perpendicular to a longitudinal length of a threaded fastener passed through an opening at an axial center of the threaded fastener head engaging portion; and
a surface engaging portion including a slot and a surface engaging face, the slot extending through the surface engaging portion along a line extending through an axial center of the surface engaging portion,
wherein an adjustable interface is defined between the surface engaging portion and the threaded fastener head engaging portion to enable the slot to receive the threaded fastener such that the surface engaging face lies parallel to a surface that is not perpendicular to the longitudinal length of the threaded fastener,
wherein the slot is defined by a noncircular opening in a plan view having a length greater than three times the diameter of the threaded fastener, and
wherein the adjustable interface allows rotation of both the threaded fastener head engaging portion and the surface engaging portion relative to each other and the longitudinal length of the threaded fastener.

2. The washer assembly of claim 1, wherein the adjustable interface comprises a convex face and a concave face configured to engage each other such that substantially all portions of the convex face and the concave face that are proximate to each other are substantially in contact with each other.

3. The washer assembly of claim 1, wherein the adjustable interface comprises a convex face opposite of the head engaging face of the threaded fastener head engaging portion and a concave face opposite the surface engaging face of the surface engaging portion.

4. The washer assembly of claim 3, wherein a depth at an axial center of the concave face is substantially equal to an amount of protrusion at an axial center of the convex face.

5. The washer assembly of claim 1, wherein
the slot is defined by an opening having a width slightly larger than the diameter of the threaded fastener, and
wherein the slot is substantially rectangular in shape.

6. The washer assembly of claim 1, wherein an amount of offset between a plane in which the surface engaging surface lies and a plane in which the head engaging face lies is adjustable at least in part based on a degree of offset of the threaded fastener from the axial center of the surface engaging portion within the slot.

7. The washer assembly of claim 1, wherein the opening in the threaded fastener head engaging portion is circular and has a diameter slightly larger than a diameter of the threaded fastener.

8. The washer assembly of claim 1, wherein the surface is greater than 4 degrees away from being perpendicular to the longitudinal length of the threaded fastener.

9. The washer assembly of claim 1, wherein the surface is greater than 15 degrees away from being perpendicular to the longitudinal length of the threaded fastener.

10. A fastening device comprising:
a threaded fastener including a head disposed at one end thereof; and
a washer assembly including:
a threaded fastener head engaging portion including a head engaging face configured to lie in a plane substantially perpendicular to a longitudinal length of the threaded fastener responsive to passing the threaded fastener through an opening at an axial center of the threaded fastener head engaging portion, the head engaging face engaging the head or nut of the threaded fastener; and
a surface engaging portion including a slot and a surface engaging face, the slot extending through the surface engaging portion along a line extending through an axial center of the surface engaging portion,
wherein an adjustable interface is defined between the surface engaging portion and the threaded fastener head engaging portion to enable the slot to receive the threaded fastener such that the surface engaging face lies parallel to a surface that is not perpendicular to the longitudinal length of the threaded fastener,
wherein the slot is defined by a noncircular opening in a plan view having a length greater than three times the diameter of the threaded fastener,
wherein the adjustable interface allows rotation of both the threaded fastener head engaging portion and the surface engaging portion relative to each other and the longitudinal length of the threaded fastener.

11. The fastening device of claim 10, wherein the adjustable interface comprises a convex face and a concave face configured to engage each other such that substantially all portions of the convex face and the concave face that are proximate to each other engage each other.

12. The fastening device of claim 10, wherein the adjustable interface comprises a convex face opposite of the head engaging face of the threaded fastener head engaging portion and a concave face opposite the surface engaging face of the surface engaging portion.

13. The fastening device of claim 12, wherein a depth at an axial center of the concave face is substantially equal to an amount of protrusion at an axial center of the convex face.

14. The fastening device of claim 10, wherein
the slot is defined by an opening having a width slightly larger than the diameter of the threaded fastener, and
wherein the slot is substantially rectangular in shape.

15. The fastening device of claim 10, wherein an amount of offset between a plane in which the surface engaging surface lies and a plane in which the head engaging face lies is adjustable at least in part based on a degree of offset of the threaded fastener from the axial center of the surface engaging portion within the slot.

16. The fastening device of claim 10, wherein the opening in the threaded fastener head engaging portion is circular and has a diameter slightly larger than a diameter of the threaded fastener.

17. The fastening device of claim 10, wherein the surface is greater than 4 degrees away from being perpendicular to the longitudinal length of the threaded fastener.

18. The fastening device of claim 10, wherein the surface is greater than 15 degrees away from being perpendicular to the longitudinal length of the threaded fastener.

* * * * *